(No Model.)
M. J. HUGHES.
PLUG FOR BOILER TUBES.
No. 581,209. Patented Apr. 20, 1897.
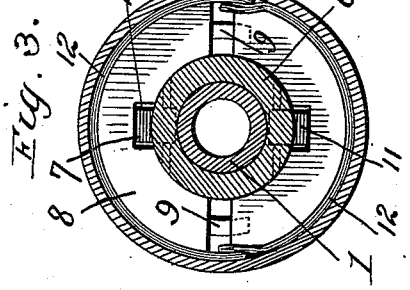
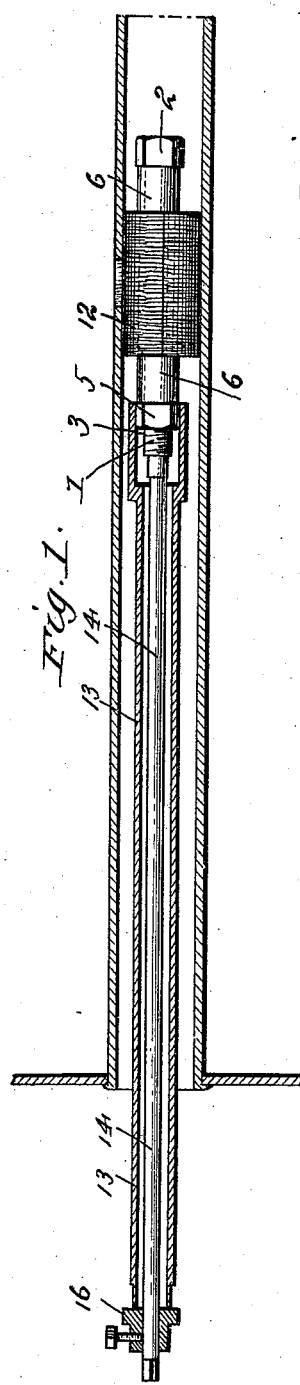
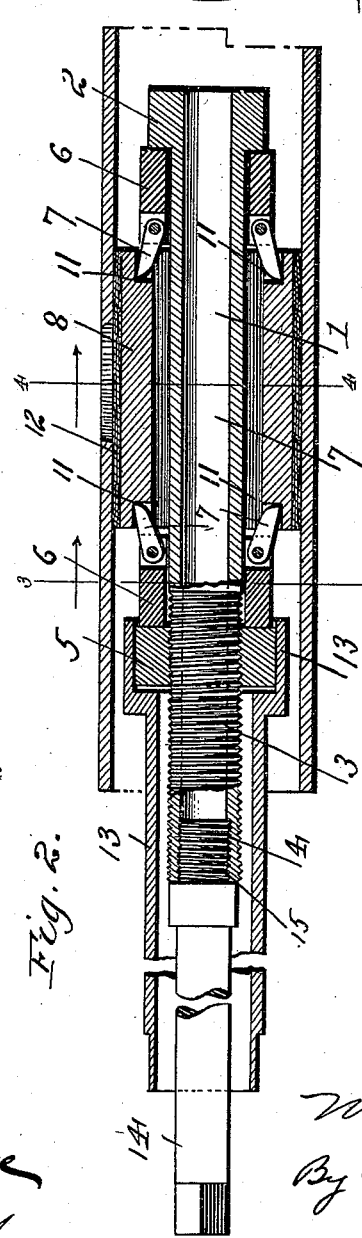
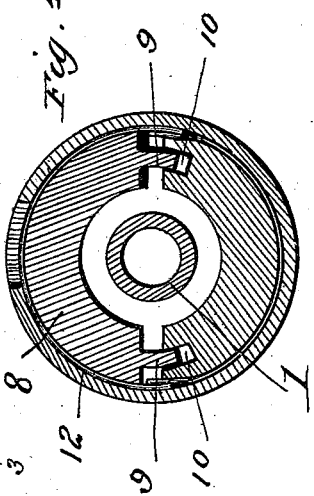
Witnesses
G. M. Lamasure
G. H. Walmsley
Inventor
Martin J. Hughes
By Alexander Davis
his Attorneys

UNITED STATES PATENT OFFICE.

MARTIN J. HUGHES, OF PORTSMOUTH, VIRGINIA.

PLUG FOR BOILER-TUBES.

SPECIFICATION forming part of Letters Patent No. 581,209, dated April 20, 1897.

Application filed February 4, 1897. Serial No. 622,018. (No model.)

*To all whom it may concern:*

Be it known that I, MARTIN J. HUGHES, a citizen of the United States, residing at Portsmouth, in the county of Norfolk and State of Virginia, have invented certain new and useful Improvements in Plugs for Boiler-Tubes, of which the following is a specification, reference being had to the accompanying drawings, in which—

Figure 1 is a view showing the plug in position in a boiler-tube. Fig. 2 is a longitudinal sectional view thereof. Fig. 3 is a cross-sectional view on line 3 3 of Fig. 2. Fig. 4 is a similar view on line 4 4 of Fig. 2.

This invention relates to a new and improved device for stopping leaks in defective boiler-tubes, and has for its object to provide a device of simple construction which may be readily and quickly operated and which when in position to stop a leak will not materially obstruct the draft through the repaired tube.

The invention consists in the novel combination and arrangement of parts hereinafter described, and particularly pointed out in the claims appended.

Referring to the various parts by numerals, 1 designates a central tube which forms the main portion of the device. This tube is formed with the head 2 at its rear end, the external right-hand screw-thread 3 at its forward end, and with the internal left-hand screw-thread 4, also at its forward end. Screwed upon the right-hand thread 3 is a large nut 5, and loosely mounted upon the tube 1 between this nut and the head 2 are two collars 6 6, one abutting against the head 2 and the other abutting against the nut 5. In recesses formed at diametrically opposite points in the adjacent faces of these collars are pivoted fingers 7. These fingers extend upwardly and toward each other and carry an expansible cylindrical closure or plug 8. This plug is tubular and is divided longitudinally, as shown, into two parts, one of which is formed with longitudinal ribs 9 9, which fit into corresponding grooves 10 10, formed in the adjacent faces of the other part. These grooves and ribs serve to maintain the two parts in their proper position and prevent any lateral movement of one upon the other. The outer ends of the fingers 7 fit within recesses 11, formed in the ends of the plug 8, their ends abutting against the inner walls of said recesses. The outer surface of the plug is covered with asbestos, as at 12, the longitudinal edges of said covering overlapping at the edges of the parts of the plug, in order that when the plug is expanded said covering will extend across the space between the two parts.

To expand the plug, a tubular wrench 13 is placed over the nut 5 and the nut screwed upon the right-hand thread, forcing collar 6 inwardly and causing fingers 7 to move outwardly and thereby force outwardly the sections of the expansible plug. To prevent the tube 1 from turning during this operation, a rod 14, formed with the left-hand threaded portion 15, is screwed into the left-hand threaded portion 4 of said tube, said rod extending through the tubular wrench 13, its outer end projecting beyond the end of the tubular wrench. The outer or free ends of the wrench and rod are formed with suitable means for being operated.

The operation will be readily understood. The rod 14 is secured to the tube 1, and the plug, by means of the rod, is slid into the defective tube of the boiler. The wrench 13 is then passed over the rod and placed in engagement with nut 5. A keeper 16 is then placed upon rod 15 and secured thereto close to the end of the wrench 13 to prevent the displacement of said wrench. The rod 14 is held rigid during the operation of the wrench by any suitable means. When the plug is secured in position and the wrench and rod 14 are removed, it will be seen that the gases may pass through the tube 1 and that the draft will not be interfered with to any great extent. It will be readily understood that the head 2 may be a nut, and the tube 1 may be threaded at its rear end to receive it.

Having thus fully described my invention, what I claim, and desire to secure by Letters Patent, is—

1. In a plug for boiler-tubes the combination of a tube formed with a stop at its rear end, a right-hand external screw-thread at its forward end, and an internal left-hand screw-thread also at its forward end, a nut engaging the external thread, means for rotating said nut, a rod engaging the internal threads of the tube and adapted to hold it stationary, and an expansible plug mounted between the nut and the stop on the rear end of the tube and operated by the longitudinal movement of the nut, substantially as described.

2. In a plug for boiler-tubes the combination of a tube formed with a stop at its rear end and an external screw-thread at its forward end, a nut engaging the said thread, means for rotating the said nut, means for holding the tube stationary, an expansible plug mounted on said tube between the nut and the stop on the rear end thereof and operated by the movement of said nut, said plug being formed of sections movable with respect to each other, substantially as described.

3. In a plug for boiler-tubes the combination of a central support formed with a stop at its rear end and a screw-thread at its forward end, a nut engaging said thread, means for rotating said nut, a movable collar on said support adjacent the nut, a pair of fingers pivoted to said collar and extending rearwardly, a pair of fingers carried by the central support at its rear end, said fingers extending forwardly, and an expansible plug supported on said fingers, substantially as described.

4. The combination of a central support formed with a stop at its rear end and a screw-thread at its forward end, a nut 5 engaging said thread, a pair of collars 6, on said support, fingers 7, plug 8 formed of two rigid sections, and supported by fingers 7, means for rotating nut 5, and means for holding the central support against rotation, substantially as described.

5. In a plugging device for tubes, the combination of a central support, two sets of radially-movable fingers carried by the central support, and an expansible plug supported between and upon said fingers, means for moving one set of the fingers to and from the other on the central support, substantially as described.

In testimony whereof I affix my signature in presence of two witnesses.

MARTIN J. HUGHES.

Witnesses:
JOB P. MANNING,
C. W. MURDAUGH, Jr.